United States Patent [19]

Hashimoto

[11] Patent Number: 5,169,182
[45] Date of Patent: Dec. 8, 1992

[54] BRANCH CONNECTION IN A HIGH PRESSURE FUEL RAIL WITH GASKET

[75] Inventor: Yoshiyuki Hashimoto, Shizuoka, Japan

[73] Assignee: Usui Kokusai Sangyo Kaisha Ltd., Japan

[21] Appl. No.: 703,167

[22] Filed: May 20, 1991

[30] Foreign Application Priority Data

May 22, 1990 [JP] Japan ............................ 2-53293[U]

[51] Int. Cl.$^5$ ........................................... F16L 19/00
[52] U.S. Cl. ................................. 285/332.2; 285/158; 285/334.1; 285/332.3; 285/917; 285/353; 285/156; 277/171; 277/179
[58] Field of Search ................... 285/158, 334.1, 332.2, 285/332.3, 917, 353, 156, 197, 199; 277/171, 179

[56] References Cited

U.S. PATENT DOCUMENTS

| Re. 6,488 | 6/1875 | Van Duzer . | |
|---|---|---|---|
| 966,870 | 8/1910 | Stoddard . | |
| 1,939,242 | 2/1932 | Thaheld | 285/334.1 |
| 2,028,316 | 1/1936 | Brynner | 285/334.1 |
| 2,098,669 | 11/1937 | Moffitt | 285/124 |
| 2,360,359 | 10/1944 | Meyers | 285/49 |
| 3,063,674 | 5/1962 | Branin | 189/36.5 |
| 3,150,889 | 10/1964 | Watts | 285/332.2 |
| 3,437,357 | 4/1969 | Rubin | 285/55 |
| 4,073,513 | 2/1978 | Blakely | 285/93 |
| 4,407,482 | 10/1983 | Daghe et al. | 285/334.1 X |
| 4,540,205 | 9/1985 | Watanabe | 285/329 |
| 4,602,796 | 7/1986 | Setterberg | 285/171 X |
| 4,832,376 | 5/1989 | Sugao | 285/158 |
| 4,893,601 | 1/1990 | Sugao | 423/468 |
| 4,900,180 | 2/1990 | Takikawa | 403/233 |

FOREIGN PATENT DOCUMENTS

| 2334445 | 5/1974 | Fed. Rep. of Germany . | |
| 547776 | 12/1922 | France | 285/353 |

Primary Examiner—Randolph A. Reese
Assistant Examiner—Timothy Aberle
Attorney, Agent, or Firm—Anthony J. Casella; Gerald E. Hespos

[57] ABSTRACT

A branch connection for a high pressure fuel rail including a passage through which high pressure fuel flows, and a plurality of through holes formed in the circumferential wall of the passage and including respective pressure receiving surfaces tapering radially outwardly from the passage. The branch connection comprises a branch element including a passage communicated with the passage of the fuel rail. The branch element includes a press head, at one end, engaged with the pressure receiving surface through a bowl-shaped seal so as to threadably secure the branch element to the fuel rail. The seal has a central hole, at least inner and outer peripheral edges of which are engaged with an end surface of the press head and the pressure receiving surface of the through hole in the fuel rail, respectively. The angle between the peripheral surface of the central hole in the seal and the pressure receiving surface is less than 90°. The angle between the peripheral surface of the central hole and the end surface is also less than 90°. The seal is made of metal and at least having a surface made of soft metal such as silver, indium, copper, brass, or aluminum.

10 Claims, 6 Drawing Sheets

BRANCH CONNECTION IN A HIGH PRESSURE FUEL RAIL WITH GASKET

BACKGROUND OF THE INVENTION

1. Field of the Invention

The present invention relates to connection of a branch element such as a branch pipe or branch fitting to a high pressure fuel rail such as a high pressure fuel line or block and in particular, to a branch connection adapted to inject fuel to a gasoline engine and particularly, to deliver fuel under a pressure of greater than 1000 kgf/cm$^2$ to a diesel engine.

2. Description of the Prior Art

A conventional branch connection is exemplified, for example, in FIGS. 12 and 13. A main pipe 11 has an inner bore or passage 12. A plurality of conical or arcuate pressure receiving surfaces 13 are formed in the circumferential wall of the main pipe 11. A branch pipe 15 has a conical or arcuate end or press head 16 engaged in the corresponding pressure receiving surface 13 of the main pipe 11. A seal 14 is in the shape of a bowl and is disposed between the pressure receiving surface 13 and the press head 16. The seal 14 includes a central straight hole 14' and a bent wall 14" extending inwardly from the central hole 14'. Upon securement of the branch to the main pipe, a space 17 is defined by the bent wall 14" of the seal, the peripheral edge of the pressure receiving surface 13, and the passage 12.

In such a connection, however, a high pressure of greater than 1000 kgf/cm$^2$ is applied to the seal 14 to provide two components $P_1$ and $P_2$. The component $P_2$ is a force (fluid pressure x $\sin\theta$) applied to separate the seal from the pressure receiving surface 13. This force, together with vibration of an engine, causes fuel to enter between the seal 14 and the pressure receiving surface 13 and thus, leak from the main pipe.

SUMMARY OF THE INVENTION

In view of the problems encountered in the prior art, it is an object of the present invention to provide a connection wherein the component of a force as produced when a high pressure is applied to the seal is used as a force to press the seal against the pressure receiving surface of the main pipe so as to prevent fluid from entering therebetween and thus, leaking from the main pipe regardless of vibration.

In order to achieve the above object, there is provided a branch connection for a high pressure fuel rail including a passage through which high pressure fuel axially flows, and a plurality of through holes formed in a circumferential wall of the passage and including respective pressure receiving surfaces tapering radially outwardly from the passage, the branch connection comprising a branch element including a passage communicated with the passage of th and a press head, at one end, engaged with the pressure receiving surface through a bowl-shaped seal so as to threadably secure the branch element to the fuel rail, wherein the seal has a central hole, at least inner and outer peripheral edges of which are engaged with an end surface of the press head and the pressure receiving surface of the through hole in the fuel rail, respectively, and wherein an angle between the peripheral surface of the central hole in the seal and the pressure receiving surface is less than 90°. Additionally, an angle between the peripheral surface of the central hole and the end surface is less than 90°. The seal is made of metal and at least having a surface made of soft metal such as silver, indium, copper, brass, or aluminum.

With the present invention thus constructed, a high pressure of greater than 1000 kgf/cm, is applied to provide two components. One of the components serves to press the seal against the end of the press head and particularly the pressure receiving surface to improve the integrity of seal therebetween. Fuel is thus prevented from entering between the seal and the press head and the pressure receiving surface and leaking therefrom for a prolonged period of time.

BRIEF DESCRIPTION OF THE DRAWINGS

For a better understanding of the present invention, reference may be made to the following description of preferred embodiments when taken in conjunction with the accompanying drawings, in which.

DESCRIPTION OF THE PREFERRED EMBODIMENTS

Figure 1:
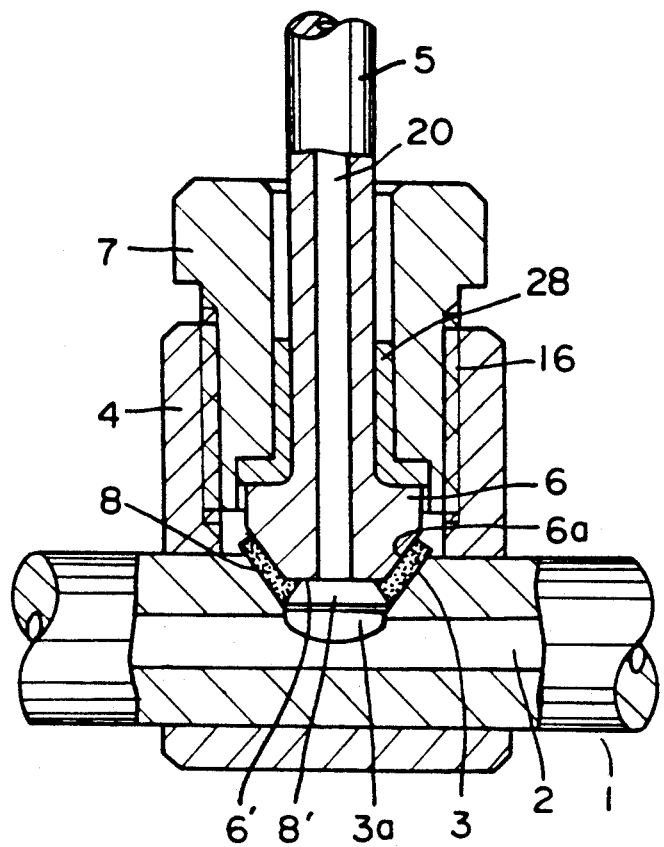
FIG. 1 is a vertical sectional view of a branch connection for use in a high pressure fuel rail.
Figure 2:
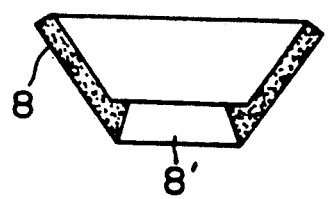
FIG. 2 is a sectional view of a seal shown in FIG. 1.

Referring to FIGS. 1 to 8, 1 is a high pressure main pipe made of carbon steel, alloy steel or stainless steel. The main pipe 1 has a relatively small diameter of approximately 20 m/m and a thickness of approximately 6 m/m. The main pipe 1 includes a passage 2. A plurality of conical through holes 3a are formed in the circumferential wall of the main pipe 1 and include corresponding pressure receiving surfaces 3. Each through hole 3a tapers radially outwardly from the passage 2. The through holes 3a are communicated with the passage 2. A discrete, short joint 4 is placed in coaxial relation to the pressure receiving surface of each through hole 3a. 5 is a branch pipe as a branch element including a passage 20. The branch pipe has a frustoconical press head 6 at one end. The frustoconical press head 6 extends through the joint 4 and has a press surface 6a engaged with the corresponding pressure receiving surface 3. A seal 8 is in the shape of a bowl and disposed between the press surface 6a and the pressure receiving surface 3. A nut 7 is fit around the branch pipe 5 through a sleeve 28. The nut 7 is secured to a threaded hole 16 of the fitting 4.

Figure 3:
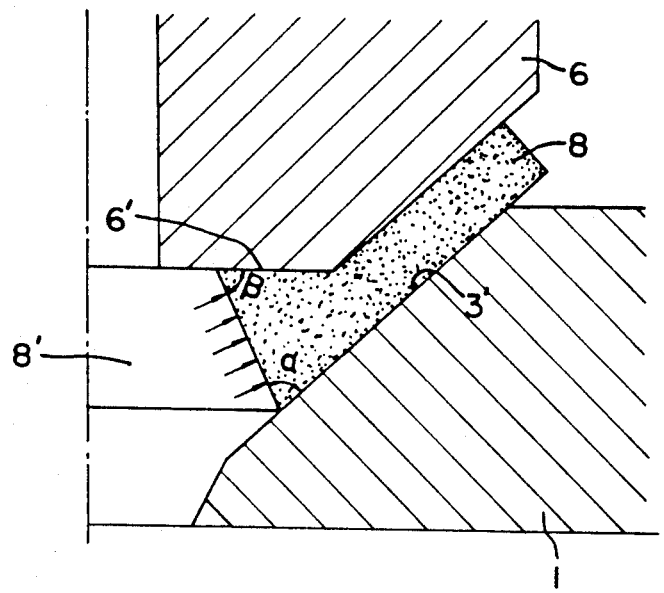
FIG. 3 is a sectional view, on an enlarged scale, of the seal.
Figure 4:
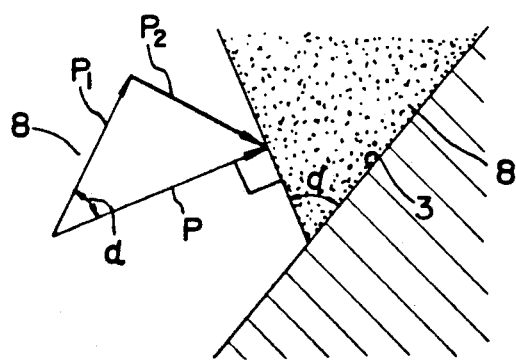
FIGS. 4A and 4B are views showing the principle of the present invention.
Figure 4:
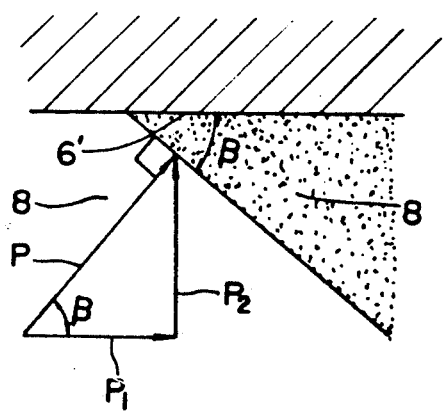

The seal 8 is made of relatively soft metal such as silver, indium, copper, brass or aluminum, or matel plated or cladded with these metals. The seal 8 has a central hole 8'. Upon securement of the branch to the main pipe, the inner and outer peripheral edges of the central 8' are situated against an end surface 6' of the press head 6 and the pressure receiving surface 3 of the main pipe 1, respectively, as shown in FIG. 3. An angle $\alpha$ formed between the central hole 8' and the end surface 6' of the press head 6 is preferably less than 90°.

Such an angle is established for the reasons as will be described with reference to FIG. 4A. A high pressure P of greater than 1000 kgf/cm, is applied at right angles to the surface of the central hole 8' to provide two components $P_1$ and $P_2$. The component $P_2$ serves to press the seal 8 against the pressure receiving surface 3 under a pressure of P x sin$\alpha$. Such a force causes the seal 8 to come into close contact with the pressure receiving surface 3 to improve the integrity of seal. Fuel, if not properly sealed, may enter between the seal 8 and the pressure receiving surface 3 and leak from the main pipe.

This is also the case with the end surface 6' of the press head 6 and the seal 8 shown in FIG. 4B. In this case, the end surface 6' of the press head 6 is contacted with the seal 8 under a pressure of P x sin $\beta$.

Figure 5:
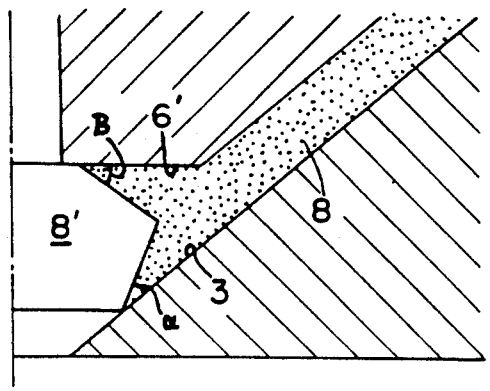
FIGS. 5 to 8 are views similar to FIG. 3 showing various modifications to the seal.
Figure 6:
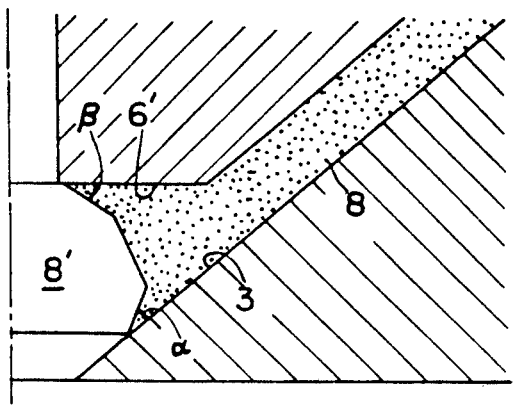

In the foregoing embodiment, the central hole 8' has a flat conical wall with the angle $\alpha$ between the peripheral surface of the central hole 6' and the pressure receiving surface and the angle $\beta$ between the peripheral surface of the central hole 8' and the end surface 6' of the press head 6 being less than 90°. Alternatively, the central hole 8' may have two or three surfaces angled relative to one another as shown in FIG. 5 or FIG. 6. In these cases, the angles $\alpha$ and $\beta$ are less than 90°.

Figure 7:
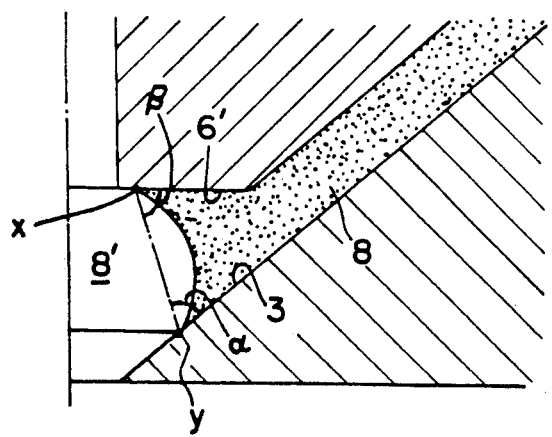

Still alternatively, the central hole 8' may have an arcuate surface as shown in FIG. 7. In such a case, the angle $\alpha$ formed between the pressure receiving surface 3 and an imaginary line extending from connection X between the inner peripheral edge of the seal 8 and the end surface 6' of the press head 6 to connection Y between the outer peripheral edge of the seal 8 and the pressure receiving surface 3 is less than 90°. The angle formed between the imaginary line and the end surface 6' of the press head 6 is also less than 90°.

Figure 8:
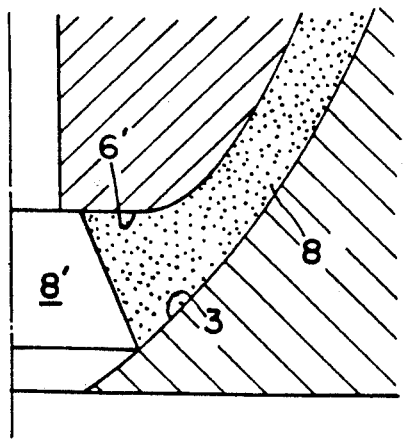

Referring to FIG. 8, the press head 6 and the pressure receiving surface 3 are arcuate in shape. In this case, the angle formed between the outer periphery of the press head 6 or the inner periphery of the pressure receiving surface 6 is less than 90°. This embodiment also falls within the scope of the present invention.

Figure 9:
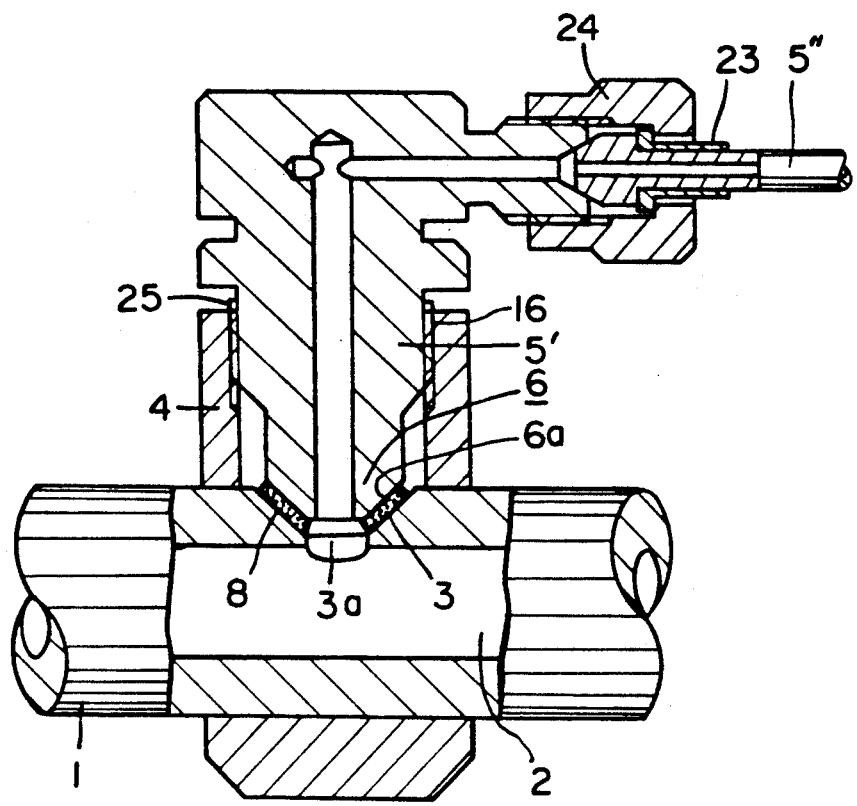
FIGS. 9 and 10 are vertical sectional views of a branch connection according to different embodiments of the present invention.

FIG. 9 is a vertical sectional view showing the principal part of another embodiment of the present invention. In this embodiment, a branch element is in the form of a branch fitting 5'. The main pipe serves as a fuel rail. The branch fitting is used to prevent interference with other components when a branch pipe is bent with large curvature. The branch fitting may be in the form of an elbow joint or may include a constant pressure valve, a damping valve, a feed valve, or a discharge valve.

In the embodiment shown in FIG. 9, the branch fitting 5' serves as a branch element connected to the main pipe 1. The branch fitting 5' has a frustoconical press head at one end as in the foregoing embodiments. The branch fitting 5' has a threaded wall 25 for threaded engagement with a threaded hole 16 of a joint 4. The branch fitting 5' is thus engaged with the pressure receiving surface 3' of the main pipe 1 through the seal 8.

A locking nut 24 is threaded onto the other end of the branch fitting 5' through a sleeve 23.

With this arrangement, a branch pipe 5' may extend in a direction parallel to the longitudinal axis of the main pipe 1.

Figure 10:
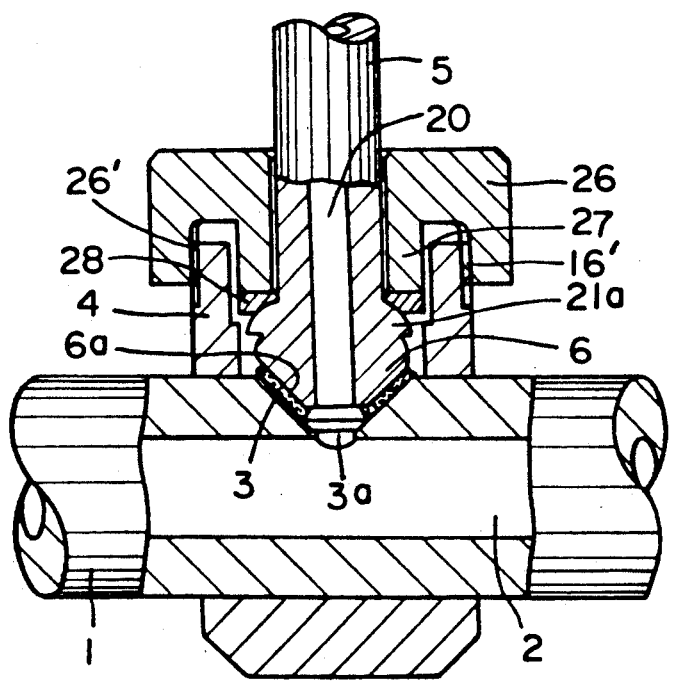

FIG. 10 is a vertical sectional view showing the principal part of a further embodiment of the present invention. In this embodiment, a locking nut 26 is used to connect the branch pipe 5 as a branch element to the main pipe 1 as a fuel rail. The locking nut 26 is centrally extended to provide a boss 27. The locking nut 26 has a thread 26' on its inner periphery. The joint 4 has a corresponding thread 16' on its outer periphery. While the thread 26' of the locking nut is threadably engaged with the thread 16' of the joint, the boss 27 presses down an annular projection 21a to cause the press surface 6a to engage with the pressure receiving surface 3 through the seal 8.

Figure 11A:
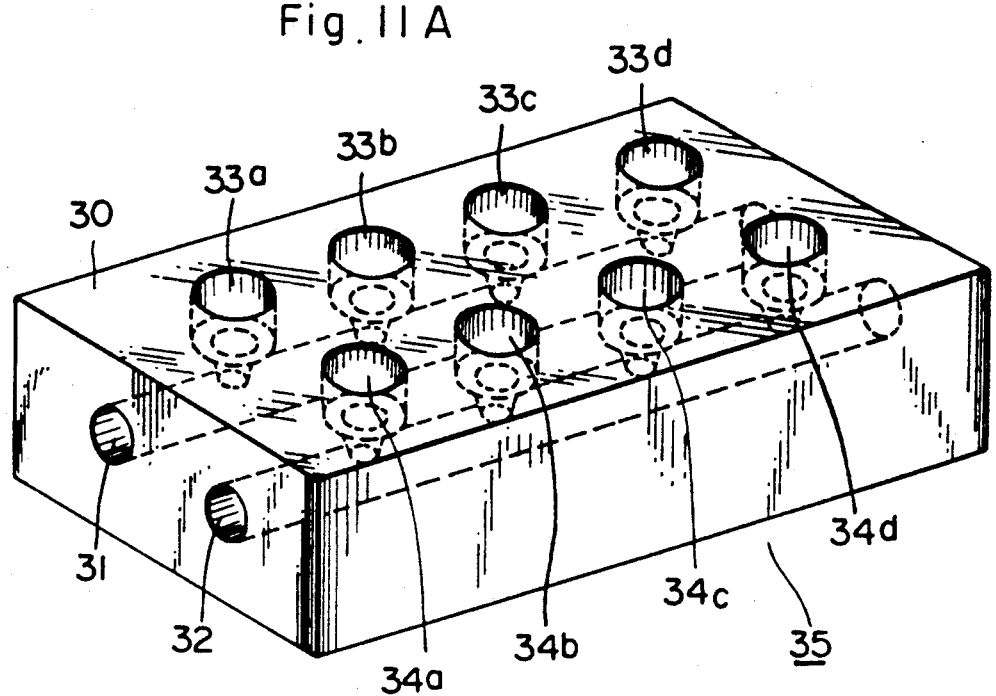
FIG. 11A is a perspective view of a branch connection according to a further embodiment of the present invention.
Figure 11B:
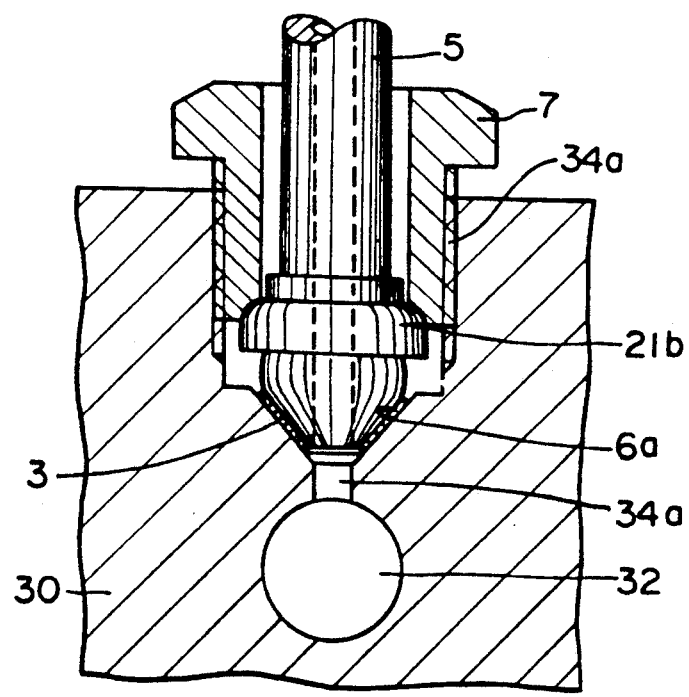
FIG. 11B is a sectional view showing the principal part of a branch connection shown in Fig. 11A.
Figure 12:
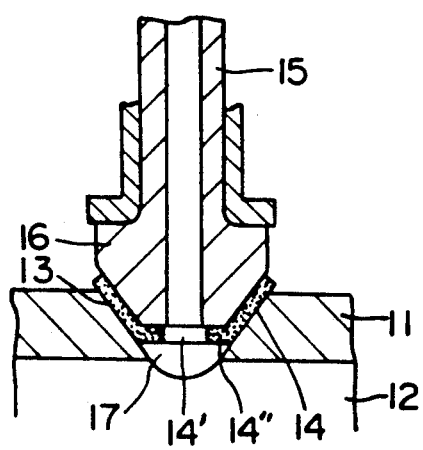
FIG. 12 is a sectional view, partly broken away, of a conventional branch connection.
Figure 13:
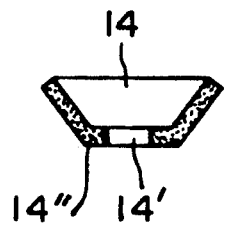
FIG. 13 is a sectional view of a seal shown in FIG. 12.
Figure 14:
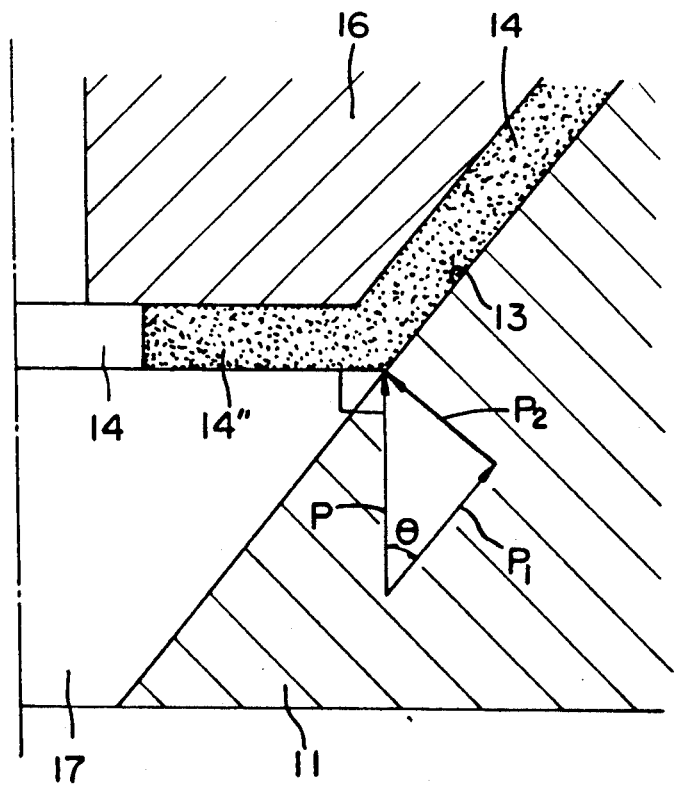
FIG. 14 is a view showing a problem encountered in the prior art.

FIGS. 11A and 11B are views showing a fuel block as a fuel rail, in lieu of the main pipe. A thick block 30 has a pair of passages 31 and 32 through which high pressure fuel flows. A plurality of mounting holes 33a to 33d and 34a to 34d are formed in the block 30 to communicate with the passages 31 and 32, respectively. These mounting holes 33a to 33d and 34a to 34d have respective pressure receiving surfaces 3 as in the foregoing embodiments. The mounting holes 33a to 33d and 34a to 34d also have threaded inner peripheral surfaces.

When the fuel block 30 is used as a fuel rail, a locking nut 7 is threaded to the threaded inner peripheral surface of each mounting hole to secure the branch element to the block. This results in engagement of the press surface 6' of the press head 6 with the pressure receiving surface 3 through the seal 8.

With the branch connection of the present invention thus far described, a high pressure is applied to the seal to provide two components. One of the components serves to press the seal 8 against the press head and particularly the pressure receiving surface 3 due to the shape of the central hole 8' of the seal 8 and contact of the inner and outer peripheral edges of the seal 8 with the press head 6 and the pressure receiving surface 3, respectively. This substantially improves the integrity of seal and thus, prevents entry and leakage of fuel for a prolonged period of time if vibration is produced due to repeated flow of high pressure fuel. The branch element can thus be safely connected to the main pipe or fuel block.

I claim:

1. In a branch connection for a high-pressure fuel rail including a passage through which high-pressure fuel axially flows, and a plurality of through holes formed in a circumferential wall of the passage and including respective pressure receiving surfaces tapering radially outwardly from the passage, said branch connection comprising a branch element including a passage communicated with the passage of the fuel rail, said branch element including a press head at one end, said press head including a press surface tapered for mating with one of the tapering pressure receiving surface of the fuel rail, the press head further including a generally radially aligned end surface extending between the tapered press surfaces and the passage of the branch element, a bowl-shaped seal disposed intermediate the press surface of the branch element and the pressure receiving surface of the fuel rail, and means to threadably secure the branch element engaged with the tapered press surface of the press head, an inner end surface engaged with the end surface of the press head, a convex outer surface engaged with the tapering pressure receiving surface of the fuel rail and a central hole, said central hole defined by at least inner and outer peripheral edges engaged with the end surface of the press head and the pressure receiving surface of the through hole in the fuel rail, respectively, the central hole of the seal being further defined by at least one peripheral surface extending between the inner and outer peripheral edges of the seal and being in communication with high-pressure fuel flowing from the fuel rail to the branch element, and wherein an angle between the peripheral surface of the central hole in the seal and the pressure receiving surface of the fuel rail is less than 90°.

2. A branch connection according to claim 1, wherein an angle between the peripheral surface of the central hole in the seal and the end surface of the branch element is less than 90°.

3. A branch connection according to claim 1, wherein said seal is made of metal and at least having a surface made of soft metal selected from the group consisting of silver, indium, copper, brass, and aluminum.

4. A branch connection according to claim 1, wherein the tapered press surface of the press head is of frustoconical configuration, and wherein the concave inner surface of the seal is of frustoconical configuration for engagement of the press head of the branch element.

5. A branch connection according to claim 1, wherein the tapered press surface of the press head is of arcuate configuration, and wherein the concave inner surface of the seal is of arcuate configuration for engagement of the press head of the branch element.

6. A branch connection according to claim 1, wherein the peripheral surface of the central hole is of frustoconical configuration, and tapering outwardly from the branch element to the fuel rail.

7. A branch connection according to claim 1, wherein the peripheral surface of the central hole in the seal is of generally arcuate shaped.

8. A branch connection according to claim 1, wherein the peripheral surface of the central hole comprises a plurality of intersecting peripheral surfaces, including an inner peripheral surface tapering outwardly from the branch element and an outer peripheral surface tapering outwardly from the fuel rail.

9. A branch connection according to claim 8, wherein the inner and outer peripheral surfaces of the central hole intersect one another.

10. A branch connection according to claim 8 further comprising an intermediate peripheral surface extending between the inner and outer peripheral surfaces of the central hole in the seal.

* * * * *